United States Patent
Scheller

[19]

[11] Patent Number: 5,944,009
[45] Date of Patent: Aug. 31, 1999

[54] PORTABLE OUTDOOR GRILL

[76] Inventor: Kris T. Scheller, Rt. #1, Box 218-E, Pillager, Minn. 56473

[21] Appl. No.: 08/872,413

[22] Filed: Jun. 10, 1997

Related U.S. Application Data

[60] Provisional application No. 60/019,568, Jun. 11, 1996.

[51] Int. Cl.⁶ .................................................. A47J 37/10
[52] U.S. Cl. .......................... 126/30; 126/25 R; 126/9 R; 126/9 B
[58] Field of Search .................................. 126/30, 25 R, 126/9 R, 9 B; 99/449, 450, 393; 248/156, 545

[56] References Cited

U.S. PATENT DOCUMENTS

| | | | |
|---|---|---|---|
| 1,384,250 | 7/1921 | Froom | 126/30 |
| 1,452,640 | 4/1923 | Hulick | 126/30 |
| 3,162,113 | 12/1964 | Tallaksen | 126/30 |
| 4,065,085 | 12/1977 | Gellatly | 126/30 |
| 4,094,296 | 6/1978 | Beagley | 126/30 |
| 4,269,164 | 5/1981 | Van Grinsven et al. | 126/30 |
| 4,351,312 | 9/1982 | Ivy | 126/9 R |
| 4,538,589 | 9/1985 | Preston | 126/30 |
| 4,553,525 | 11/1985 | Ruble | 126/30 |
| 4,607,608 | 8/1986 | Allred et al. | 126/30 |
| 4,732,138 | 3/1988 | Vos | 126/9 R |
| 4,856,423 | 8/1989 | Burns | 126/30 |
| 4,896,651 | 1/1990 | Kott, Jr. | 126/30 |
| 4,979,490 | 12/1990 | Nudo et al. | 126/30 |
| 5,297,534 | 3/1994 | Louden | 126/30 |
| 5,666,940 | 9/1997 | Kreiter | 126/30 |

FOREIGN PATENT DOCUMENTS

| | | | |
|---|---|---|---|
| 2437186 | 5/1980 | France | 126/30 |

Primary Examiner—Ira S. Luzarus
Assistant Examiner—David Lee
Attorney, Agent, or Firm—D. L. Tschida

[57] ABSTRACT

A portable grill which permits adjustment of a food support platform in three dimensions. A ground support accepts a trussed stanchion and permits rotation of the stanchion. The ground support can be a tubular ground stake or may comprise a support stand. A swing arm is reciprocally mounted to the stanchion and supports one or more couplers having support hooks, a chain and an "S" hook. A harness is suspended from the S hook and secured to a cooking platform.

11 Claims, 2 Drawing Sheets

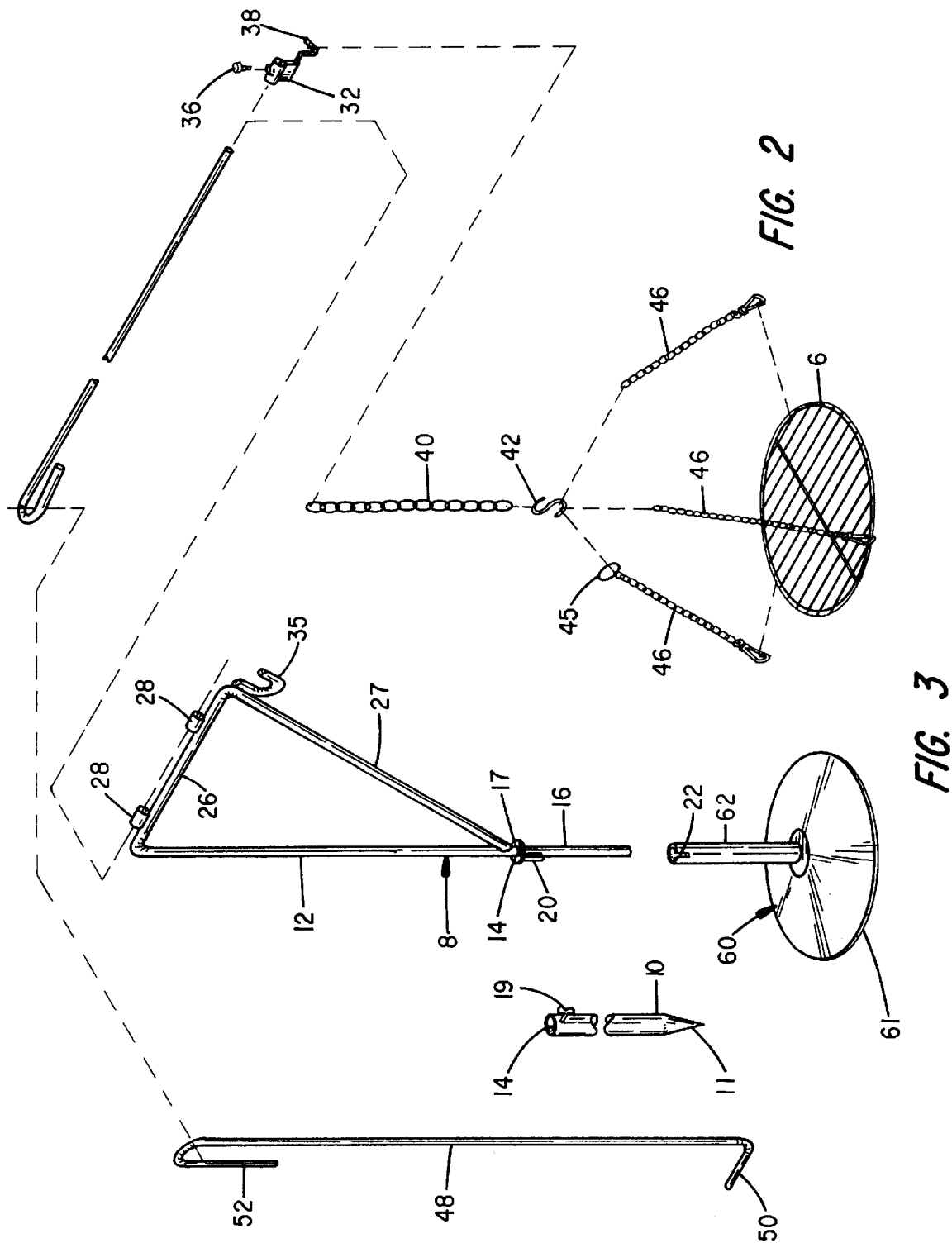

PORTABLE OUTDOOR GRILL

This is a continuation of co-pending provisional application Ser. No. 60/019,568, filed Jun.11, 1997.

BACKGROUND OF THE INVENTION

The present invention relates to open fire cooking appliances and, in particular, to a portable open fire grill having a cooking platform that can be adjusted three dimensionally relative to a cook fire.

Numerous types of outdoor grills have been developed over the years for supporting food above a cook fire. Many consist of simple assemblies for securing a mesh or wire form grill a fixed height above the fire. For example, rocks or bricks can be used to support the grill. Wheel rims, on occasion, have been used to contain a fire and support a grill. Parks frequently also provide raised, welded fire boxes having mesh grill covers. Various other fire box assemblies with stationary or folding legs and grill covers have also been constructed.

Tripod grill supports are also known. Such supports typically support a circular, mesh grill beneath the apex of an assembled framework, which grill may be vertically adjusted along a chain or other hanger. For example, reference U.S. Pat. No. 4,732,138.

Some cooking assemblies provide an upright stanchion or stake, which is driven into the ground, adjacent the fire, and which can support one or more mesh platforms, griddles or grills. The grills can be adjusted vertically along the stanchion or the grills can be rotated away from the fire. A coupler at the grill may interconnect with mating couplers secured along the stanchion or the coupler may permit a tilting action and whereby the grill to is held by friction to the stanchion. Multiple or an infinite number of cooking heights can be obtained with such a coupling. Examples of such cooking assemblies are shown at U.S. Pat. Nos. 4,351,312; 4,553,525; 4,538,589; and 4,607,608.

Although the foregoing assemblies permit adjustment of the cooking surface along one or two axes, they do not accommodate three dimensional adjustment. The cooking assembly of the present invention provides a portable assembly which disassembles for compact storage. The assembly also permits substantially infinite adjustment of the cooking surface in three dimensions, which enhances its value in relation to outdoor cooking, where the vagaries of the wind and the fire can make it difficult to tend foodstuffs being cooked. The assembly can be mounted to a driven stake or a support stand.

SUMMARY OF THE INVENTION

Accordingly, it is a primary object of the invention to provide a portable campfire grill which permits adjustment of a support arm which supports a cooking surface or grill and appurtenant pans in three dimensions.

It is a further object of the invention to provide a grill which can be rotated, vertically elevated, or extended or retracted in relation to the flame, smoke and coals of a heat source to obtain optimal cooking conditions.

It is a further object of the invention to provide a light weight cooking grill which disassembles for convenient storage and transport.

It is a further object of the invention to provide a cooking grill having a minimal number of durable parts to accommodate many years of outdoor cooking.

Various of the foregoing objects, advantages and distinctions of the invention are obtained in a presently preferred portable grill. The grill provides a ground stake or ground plate which receives an upright stanchion. A horizontal section of the stanchion includes sleeves which receive a swing arm. The swing arm includes an end stop and one or more couplers which support a grill and other cooking appliances, and the position of which couplers can be adjusted along the arm. The grill coupler supports a grill adjustment chain and a support harness for a mesh or wire frame grill, that forms a cooking surface or support for foodstuffs, pans etc. placed on the grill. Alternatively, pans may also be supported at others of any available couplers.

Still other objects, advantages and distinctions of the invention will become more apparent from the following description with respect to the appended drawings. Similar components and assemblies are referred to in the various drawings with similar alphanumeric reference characters. The description should not be literally construed in limitation of the invention. Rather, the invention should be interpreted within the broad scope of the further appended claims.

BRIEF DESCRIPTION OF THE DRAWINGS

FIG. 2 is a perspective drawing showing the grill in exploded assembly.

FIG. 3 is a perspective drawing to an alternative ground support platform for the grill.

DESCRIPTION OF THE PREFERRED EMBODIMENT

Figure 1:
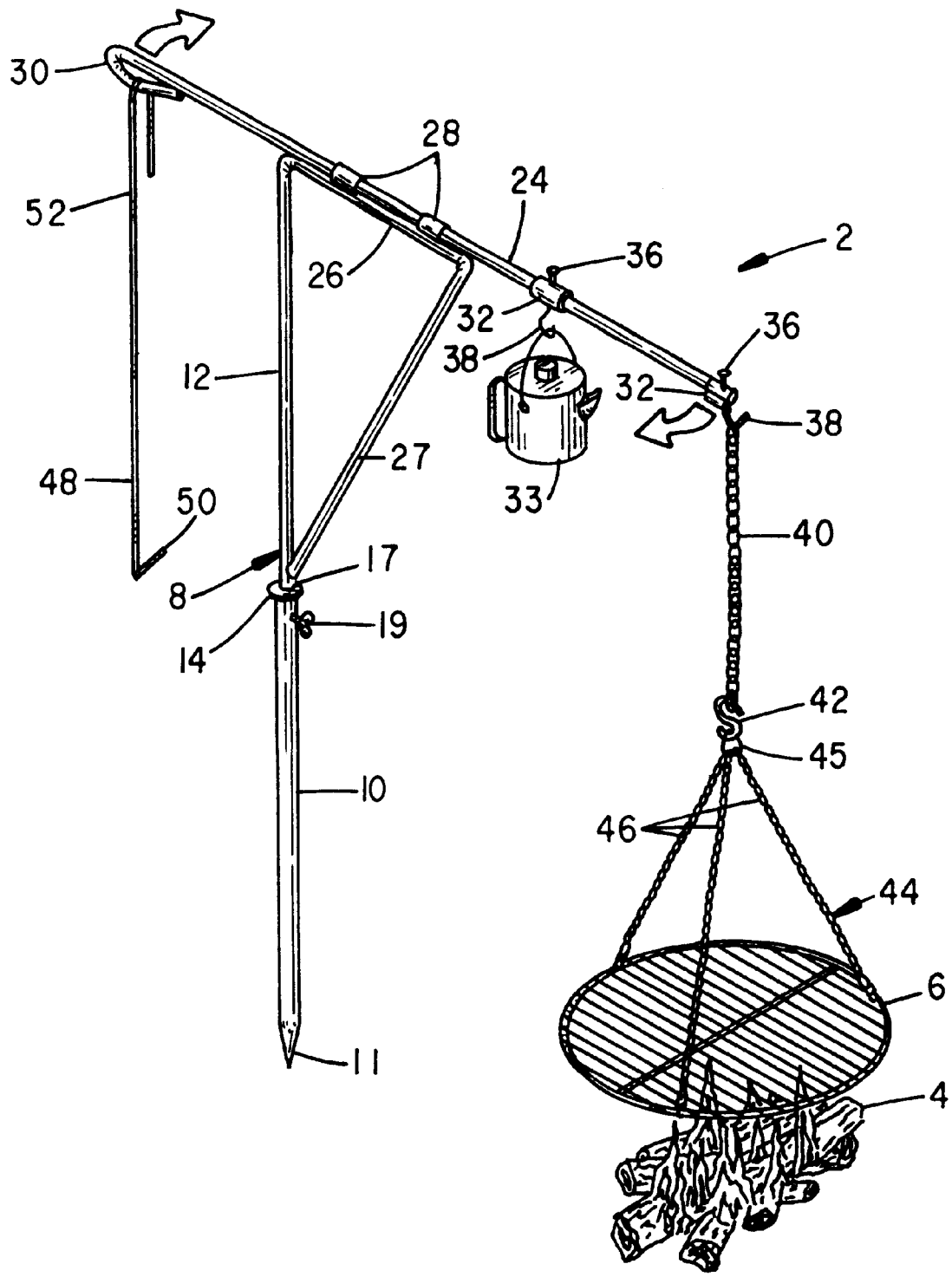
FIG. 1 is a perspective drawing showing the grill of the invention mounted over an outdoor fire.

Referring to FIGS. 1 and 2, views are shown to a presently preferred construction of a portable, outdoor cooking grill 2, which can be used with an open, wood fire or a charcoal fire 4. The fire 4 can be set in any available fire pit, whether at home, a park or a remote camping site. The grill 2 is mounted adjacent to the fire 4 a sufficient distance to permit three dimensional adjustments of a mesh or wire form cooking platform 6 relative to the fire 4. That is, the platform 6 can be elevated, rotated or extended relative to the fire 4 and which adjustments are discussed in detail below. Such a flexibility permits optimal placement of the platform 6 relative to the fire 4 to achieve a preferred cooking temperature and fire condition. The adjustments particularly accommodate the ever changing conditions of open outdoor fires and the consequential smoke, flames and changing heat conditions of the fire and coals.

The grill 2 includes an upright, braced stanchion 8 and a ground stake 10. The ground stake 10 includes a pointed end 11 to facilitate setting in rocky soils, although may not require a point 11. During setting, it is preferred that the stake 10 be set with a wooden mallet or other soft driver to avoid mushrooming the exposed end of the stake 10.

A vertical section 12 of the stanchion 8 mounts to a bore 14 of the ground stake 10. Specifically, a lower end 16 of the vertical section 12 mates to the bore 14 to permit rotation of the end 16 within the bore 14. The insertion depth of the end 16 is limited by a stop flange 17.

Uncontrolled rotation of the stanchion 8 is prevented by a thumb or set screw 19 that extends through the ground stake 10 and which can be tightened as necessary. Alternatively, the bore 14 and end 16 can be closely sized, such as by fitting a bushing to the bore 14. A projecting key 20, reference FIG. 2, might also be secured to the end 16 or stop flange 17. A mating slot or fastener can be formed into or secured to the ground stake 10 to determine a fixed position for the grill. An exemplary keyed slot 22 is shown in an alternative ground support 60, shown at and discussed with reference to FIG. 3 below. Aligned holes in the stake 10 and end 16 might also be fitted with a lynch pin.

A variety of other interlocking fittings or fasteners might be provided between the stanchion 8 and ground stake 10 to limit the freedom of rotation of the stanchion 8. The foregoing thumb screw 19, key 20 or other interlocking fasteners can also be deleted, provided the grill 2 is assembled and positioned such that the weight of the platform 6 and foodstuffs or pots supported to the grill 2 don't overbalance the grill 2 and create undesired rotation.

During cooking and as necessary, the cook can release the thumb screw 19 or elevate the end 16 to disconnect the key 20 from the slot 22 and rotate the platform 6 away from the fire 4. The food and/or cooking pots can then be attended without concern for the open flames and smoke of the fire 4. Once attended, the platform 6 can be repositioned over the fire 4.

The platform 6 is supported to a swing arm 24 that extends parallel to a horizontal section 26 of the stanchion 8. A brace or truss section 27 extends between the sections 12 and 26. The swing arm 24 is mounted within a pair of sleeve couplers 28 fastened to the section 26 and can be extended and retracted as desired. The range of extension is limited by a stop bend or handle 30 formed into one end of the swing arm 26 and a coupler 32 secured along the arm 26. The grill 2 is normally mounted a distance from the fire 4 within the range of extension. The platform 6 can thereby be extended and retracted, as well as rotated, relative to the fire 4.

A variety of stops can be formed into or attached to the arm 24. Multiple couplers 32 may also be secured to the arm 24 to support more than one platform 6 or possibly to support a coffee pot 33 or other covered appliance to the swing arm 24. A hook 35 or coupler 32 might also be secured to the brace 27.

The weight of the arm 24 and platform 6 are distributed by the sections 26 and 28 to the stanchion 8. The arm 24 can be constructed to interlock in a preferred orientation with the couplers 28, such as by using a hexagonal rod stock at the arm 24 or including another indexing or alignment guide. In normal practice, once the end coupler 32 has been fitted to the arm 24 with the stop bend 30 oriented as depicted, the weight of the platform 6 assures a proper orientation of one to the other during normal use.

A set screw 36 at the couplers 32 secures the couplers 32 to the arm 24. Either coupler 32 can be adjusted anywhere along the arm 24. "J" hooks 38 depend from each of the couplers 32. The hook 38 at the inner coupler 32 can be used to support the handle of a covered pot, such as the depicted coffee pot 33. Alternatively and as with the end coupler 32, a chain 40 having an "S" hook 42 can be attached to the inner coupler 32. The hook 42 can support a pot handle or can support an appropriate harness to another campfire appliance.

The cooking platform 6 is secured to the end coupler 32 with a chain harness 44. The harness 44 is constructed of three sections of chain 46 which are equally displaced around and attached to the periphery of the round platform 6 and are secured to a ring 45 at an apex. The vertical height of the platform 6 relative to the fire 4 can be varied by setting the position of the hook 42 at the chain 40 or the chain 40 at the hook 38 of the end coupler 32. As the condition of the fire 4 changes, the platform 6 can be rotated or retracted and the length of the chain 40 varied to assure a proper cooking height. The chain 40 and/or chain harness 44 might also be constructed of appropriate cable assemblies which permit length adjustments.

Supported to the stop 30 is a poker 48. The poker 48 can be used to tend the fire 4; although, a right angled end 50 is primarily used to catch the platform 6 during the rotation of the stanchion 8, retraction of the arm 24 or other cooking chores. A looped handle 52 is formed into an opposite end and the poker 48. The poker 48 is normally stored at the grill 2 by securing the handle 52 to the stop 30.

Presently, the stanchion 8 and arm 24 are constructed of a ½ inch rod stock, although can be formed from a variety of materials and differently sized stocks, provided the material is able to tolerate the heat from the fire 4, the anticipated weights and typical outdoor conditions. The platform 6 can either be constructed as a wire form assembly, as depicted, or may be constructed of a mesh material or may include a mesh cover which mounts over a wire form base. Preferably, the platform 6 should not allow supported foods to fall through the platform 6.

Although a grill platform 6 is shown, a variety of other cooking appliances might be attached to the hook 42, for example, the covered coffee pot 33, a steaming chamber, a smoking chamber (which might support wood chips, a water tray and an overlying grill) or other suitable cooking appliance. A variety of other harnesses might also be used to secure such appliances to the arm 24, chain 40 or coupler 32.

FIG. 3 depicts an alternative ground stand 60 that might be used to support the stanchion 8 in lieu of a ground stake 10. The stand 60 generally consists of a flat or slightly cupped ground plate 61 and from which a tubular member 62 extends. The member 62 includes a slot 22, although can include any of the mating fasteners discussed above. In lieu of securing the stanchion 8 to the bore 14 of a ground stake 10, the stanchion 8 is mounted to the member 62 and stand 60 is appropriately positioned adjacent to the fire 4. The stand 60 can be repositioned as desired during cooking, if other suitable adjustments cannot be made to assure optimal cooking conditions between the platform 6 and fire 4.

While the invention has been described with respect to a preferred construction, still other constructions may be suggested to those skilled in the art. The foregoing description should be construed to include all those embodiments within the spirit and scope of the following claims.

What is claimed is:

1. An outdoor cooking grill comprising:

a) a ground stake;

b) a stanchion and means for securing said stanchion to rotate at said ground stake and wherein said stanchion includes a horizontal section which extends from a vertical section and a brace section which extends between said vertical and horizontal sections;

c) a swing arm and i) means for retaining the swing arm to the horizontal section and permitting reciprocating movement of the swing arm parallel to the horizontal section, ii) stop means for limiting the movement of the swing arm, and iii) a first coupler mounted to said swing arm for supporting a chain and a first hook coupled to the chain;

d) a meshwork having a cooking surface; and e) a harness mounted to said first hook for suspending said meshwork.

2. Grill apparatus as set forth in claim 1 wherein said stanchion includes a portion which mounts within a bore of said ground stake and a stop for limiting the mounting depth of said stanchion within said bore.

3. Grill apparatus as set forth in claim 1 wherein the ground stake has a hollow bore.

4. Grill apparatus as set forth in claim 1 wherein said first coupler includes means for fixing the mounting location of said first coupler along said swing arm.

5. Grill apparatus as set forth in claim 1 wherein said swing arm includes a second coupler that is movable along the swing arm and includes a second hook.

6. Grill apparatus as set forth in claim 1 including means for controlling the rotation of said stanchion relative to said ground stake.

7. An outdoor cooking grill comprising:
   a) a ground stake having a bore;
   b) a stanchion and, wherein said stanchion includes a horizontal section which extends from a vertical section which mounts to the bore of the ground stake and a brace section which extends between said vertical and horizontal sections, and wherein said stanchion can rotate in said bore;
   c) a swing arm and means for retaining the swing arm to the horizontal section and permitting reciprocating movement of the swing arm parallel to the horizontal section;
   d) a platform having a cooking surface; and
   e) chain means for adjustable suspending said platform from said swing arm.

8. Grill apparatus as set forth in claim 7 wherein a coupler having a first hook is secured to the swing arm with a set screw and wherein said chain means is suspended from said first hook.

9. Grill apparatus as set forth in claim 7 wherein said ground stake includes means for limiting the rotation of said stanchion relative thereto.

10. Grill apparatus as set forth in claim 7 wherein said ground stakes includes a set screw.

11. Grill apparatus as set forth in claim 7 including a flange mounted to said vertical section and having means for preventing the rotation of said stanchion.

* * * * *